(12) United States Patent
Madabhushi et al.

(10) Patent No.: US 10,503,959 B2
(45) Date of Patent: Dec. 10, 2019

(54) PREDICTING CANCER PROGRESSION USING CELL RUN LENGTH FEATURES

(71) Applicant: Case Western Reserve University, Cleveland, OH (US)

(72) Inventors: Anant Madabhushi, Shaker Heights, OH (US); Cheng Lu, Cleveland Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 66 days.

(21) Appl. No.: 15/901,190

(22) Filed: Feb. 21, 2018

(65) Prior Publication Data

US 2018/0253591 A1 Sep. 6, 2018

Related U.S. Application Data

(60) Provisional application No. 62/466,554, filed on Mar. 3, 2017.

(51) Int. Cl.
| | |
|---|---|
| *G06K 9/00* | (2006.01) |
| *G06T 7/00* | (2017.01) |
| *G06T 7/41* | (2017.01) |

(52) U.S. Cl.
CPC ........ *G06K 9/00147* (2013.01); *G06T 7/0012* (2013.01); *G06T 7/41* (2017.01); *G06T 2207/10024* (2013.01); *G06T 2207/10056* (2013.01); *G06T 2207/20072* (2013.01); *G06T 2207/20076* (2013.01); *G06T 2207/20081* (2013.01); *G06T 2207/30024* (2013.01);
(Continued)

(58) Field of Classification Search
USPC .................................................. 382/128, 133
See application file for complete search history.

(56) References Cited

U.S. PATENT DOCUMENTS

| | | | | |
|---|---|---|---|---|
| 5,989,811 A | * | 11/1999 | Veltri | G01N 33/574 435/6.14 |
| 6,026,174 A | * | 2/2000 | Palcic | G01N 1/30 382/128 |

(Continued)

OTHER PUBLICATIONS

Doyle et al., Automated Grading of Prostate Using Architectural and Textural Image Features, IEEE 1-4244-0672-2/07, pp. 1284-1287. (Year: 2007).*

*Primary Examiner* — Ishrat I Sherali
(74) *Attorney, Agent, or Firm* — Eschweiler & Potashnik, LLC

(57) ABSTRACT

Embodiments include an image acquisition circuit configured to access an image of a region of tissue demonstrating cancerous pathology, a nuclei detection and graphing circuit configured to detect cellular nuclei represented in the image; and construct a nuclear sub-graph based on the detected cellular nuclei, where a node of the sub-graph is a nuclear centroid of a cellular nucleus; a cell run length (CRF) circuit configured to compute a CRF vector based on the sub-graph; compute a set of CRF features based on the CRF vector and the sub-graph; and generate a CRF signature based, at least in part, on the set of CRF features; and a classification circuit configured to compute a probability that the region of tissue will experience cancer progression, based, at least in part, on the CRF signature; and generate a classification of the region of tissue as a progressor or non-progressor.

20 Claims, 7 Drawing Sheets

(52) U.S. Cl.
CPC ............... *G06T 2207/30072* (2013.01); *G06T 2207/30088* (2013.01); *G06T 2207/30096* (2013.01)

(56) References Cited

U.S. PATENT DOCUMENTS

| | | | | |
|---|---|---|---|---|
| 8,718,340 | B2* | 5/2014 | Madabhushi | G06K 9/3233 |
| | | | | 382/128 |
| 9,292,933 | B2* | 3/2016 | Madabhushi | G06T 7/149 |
| 9,424,460 | B2* | 8/2016 | Madabhushi | G06K 9/0014 |
| 2006/0036372 | A1* | 2/2006 | Yener | G06K 9/0014 |
| | | | | 702/19 |
| 2010/0177950 | A1* | 7/2010 | Donovan | G16H 50/30 |
| | | | | 382/133 |
| 2010/0298166 | A1* | 11/2010 | Alon | A61K 31/4745 |
| | | | | 506/10 |
| 2011/0243417 | A1* | 10/2011 | Madabhushi | G06K 9/3233 |
| | | | | 382/131 |
| 2015/0030219 | A1* | 1/2015 | Madabhushi | G06T 7/149 |
| | | | | 382/128 |
| 2015/0254493 | A1* | 9/2015 | Madabhushi | G06K 9/0014 |
| | | | | 382/133 |

* cited by examiner

PREDICTING CANCER PROGRESSION USING CELL RUN LENGTH FEATURES

CROSS REFERENCE TO RELATED APPLICATIONS

This application claims the benefit of U.S. Provisional Application 62/466,554 filed Mar. 3, 2017.

FEDERAL FUNDING NOTICE

The invention was made with government support under the National Cancer Institute of the National Institutes of Health award numbers 1U24CA199374-01, R01CA202752-01A1, R01CA208236-01A1, R21CA195152-01, R21CA179327-01A1, the National Institute of Diabetes and Digestive and Kidney Diseases under award number R01 DK098503-02, National Center for Research Resources under award number 1 C06 RR12463-01, the DOD Prostate Cancer Synergistic Idea Development Award (PC120857), the DOD Lung Cancer Idea Development New Investigator Award (LC130463), the DOD Prostate Cancer Idea Development Award, and the DOD Peer Reviewed Cancer Research Program W81XWH-16-1-0329. The government has certain rights in the invention.

BACKGROUND

P16+ oropharyngeal squamous cell carcinoma (OP-SCC) affects a group of patients in which 15% to 35% of the patients suffer from recurrence, including metastasis. Nuclear morphology plays a key role in determining the grade and prognosis for a number of different cancers, including OP-SCC. Quantitative measurements of nuclear architecture and arrangement within local cell clusters represented on digitized histopathology images have been employed to differentiate between types of low and high risk cancers. Graph theory has been employed to study the spatial arrangement of nuclei and cells within digital pathology images. By considering a nucleus in a histology image as a vertex or node of a graph, and by connecting the vertices with edges, a variety of different spatial and nuclear graph arrangements may be quantified and tested for their value in predicting disease recurrence and outcome.

Conventional graph-based approaches to cancer grading and prediction compute first order statistics of inter-nuclear distance and nodal density and base their predictions on these first order statistics. For example, statistics related to edge length and node density extracted from spatial nuclear graphs, such as those derived from Voronoi triangulation and Delaunay triangulation, have been used to predict disease grade and severity. Other conventional graph-based approaches employ cell graphs to study local nuclear architectural complexity by decomposing an image into sub-graphs by replacing clusters of nuclei with a single representative node and encoding edge connections to proximal nodes only.

However, these conventional graph-based approaches do not capture the degree of complexity associated with repeating sub-graph patterns, and typically only extract global graph features. Most conventional graph-based approaches are limited to simple measurements such as mean/variance of inter-nuclear distance or measurements related to node density. These first order statistics do not capture the degree of complexity associated with repeating sub-graph patterns. Furthermore, global graph edges often traverse the epithelial and stroma regions, which have distinct biological morphology in tumor progression. Moreover, since conventional graph-based approaches inherently extract only global features, important information involving local spatial interactions is left unexplored. Thus, conventional approaches to predicting cancer recurrence are not optimal, and an improved approach to predicting cancer recurrence or progression is desirable.

BRIEF DESCRIPTION OF THE DRAWINGS

The accompanying drawings, which are incorporated in and constitute a part of the specification, illustrate various example apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that, in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
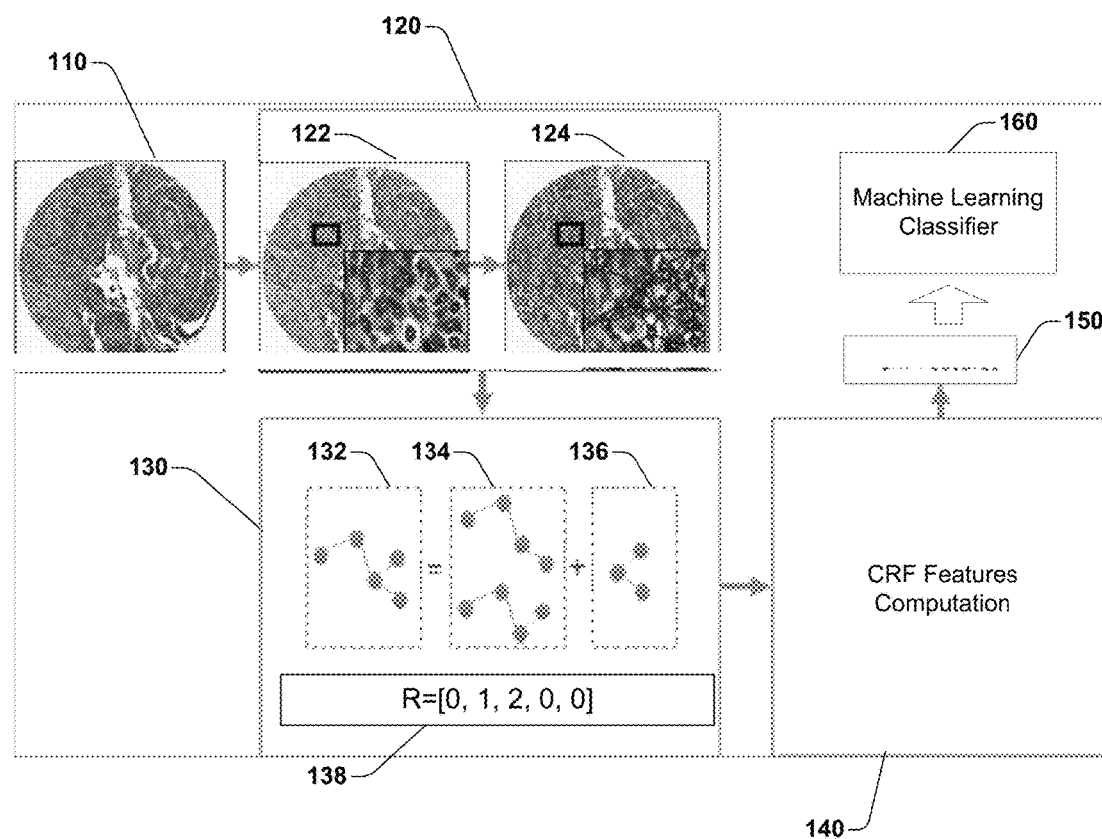
FIG. 1 is a schematic overview of a workflow for computing a cell run-length feature (CRF).

Embodiments described herein predict cancer progression using a cell run length feature (CRF) generated from a digitized pathology image of a region of tissue demonstrating cancerous pathology. A CRF captures local cell graph complexity by expressing the total number of different ways (i.e., runs) that cell graph vertices may be traversed in a cell graph. Embodiments described herein predict disease progression, including p16+ OP-SCC progression, with an area under the receiver operating characteristic curve (AUC) of at least 0.76. In comparison, conventional approaches that rely on global graph-based first order statistics only achieve AUCs of 0.71 and below.

Nuclear morphology and pleomorphism are key factors in determining the grade of a number of different types of cancers. Graph theory has been used to study the spatial arrangement of nuclei and cells represented in digital pathology images. Graph-based approaches facilitate understanding interactions between histological primitives, including nuclei, lymphocytes, or glands, and evaluating how and if these spatial interactions are predictive of disease recurrence and outcome. Cancerous cells tend to self-organize into clusters and the patterns associated with these clusters tend to differ between more and less aggressive cancers. For instance, tissue specimens of cancers with increased nuclear architectural complexity are known to have worse prognoses compared to cancers with lower architectural complexity. Conventional approaches employ statistics relating to edge length and node density extracted from spatial nuclear graphs, such as those derived from Voronoi triangulation (VT) and Delaunay triangulation (DT), to predict disease grade and severity. However, these conventional approaches are limited to analyzing global interactions of distally located cells.

Some conventional approaches employ cell graphs (CG) to study local nuclear architectural complexity. CG-based approaches decompose an image into sub-graphs by replacing clusters of nuclei with a single representative node and encoding edge connections to proximal nodes only. Numeric features extracted from the cell graphs, such as topological separation of individual nuclei are used to express the underlying molecular biology of the tumor. However, most graph-based measurements are typically limited to simple measurements such as the mean/variance of inter-nuclear distance, or are related to node density. Furthermore, these first order distance statistics do not capture the degree of complexity associated with repeating sub-graph patterns. Additionally, the global graph edges employed by conventional techniques often traverse the epithelial and stroma regions, which have distinct biological morphology in tumor progression. Thus, conventional global graph-based and CG-based techniques inherently extract only global features and are sub-optimal. Embodiments described herein predict recurrence or progression by, in part, extracting information involving local spatial interactions that conventional approaches are unable to recognize or use.

In graph theory, the number of graph cycles, which is the maximum number of independent cycles in a graph, may be used to estimate the complexity of a graph. For example, the number of graph cycles can be used as an indicator of the level of development and complexity of a transport system, since the degree of graph complexity is proportional to the value of graph cycles. However, conventionally, graph cycles have been used to quantify the complexity of a cyclic graph rather than acyclic or open graphs. In data science, the concept of run length describes a sequence in which the same data value occurs in consecutive data elements. In image analysis, run length has been used to quantify the pixel intensity patterns (i.e., texture) in digital images by counting the number of consecutive aligned pixels with the same intensity. With respect to medical imaging, however, run length has conventionally been limited to image segmentation. For example, the graph run length matrix (GRLM) describes texture patterns buried in digital images. For a given image a gray-level run is defined as a set of consecutive, collinear pixels having the same gray level. Histological primitives present in the image are identified and then classified into sub classes. A global graph is constructed using the primitives as graph nodes. For each node, a GRLM is constructed and used for image segmentation.

Embodiments described herein extract discriminative measurements from local cell cluster graphs. Embodiments compute graph run length statistics to capture the spatial complexity of nuclei within sub-graphs via CRFs. While the graph cycle measurement based approaches used by conventional graph-based techniques account for the number of independent cycles in a graph, conventional approaches are unable to measure the intrinsic complexity of a graph without cycles (e.g., the nuclear sub-graph 132 illustrated in FIG. 1). Embodiments described herein improve on conventional approaches because example embodiments capture the spatial complexity of nuclei within sub-graphs without requiring the segmentation or classification of nuclei, thereby reducing the computational complexity required to predict disease progression or recurrence. Thus, embodiments described herein implemented as part of a cancer progression prediction system, or a personalized medicine system, improve the performance of the system or computer on which the system is implemented by requiring reduced computational complexity while providing increased predictive accuracy. Embodiments described herein further improve on conventional approaches by constructing local sub-graphs based on the proximity of nuclei rather than a global graph, and further construct a graph run length vector for a local sub-graph rather than needing to construct a graph run length matrix for each node in a global graph.

FIG. 1 is a schematic overview of a workflow for computing CRF features. FIG. 1 illustrates an example histology image 110 of a region of tissue demonstrating cancerous pathology. A nuclei detection and graphing step 120 includes, at 122, detecting nuclei represented within image 110. Nuclear sub-graphs are constructed at 124. A CRF vector computation step is illustrated at 130. A first nuclear sub-graph 132 is decomposed into different possible runs. For example, two 4-runs are illustrated at 134, and one 3-run is illustrated at 136. A CRF vector 138 is then generated. CRF vector 138 indicates the number of runs of lengths from two to six present in the sub-graph: the first element of CRF vector 138 indicates the number of length 2 runs, the second element indicates the number of length 3 runs (e.g., 1), the third element indicates the number of length 4 runs (e.g., 2), the fourth element indicates the number of length 5 runs, and the fifth element indicates the number of length 6 runs. The CRF vector 138 is then provided to a CRF features computation step 140. In this example, CRF features computation step 140 computes four CRF features 150: short run emphasis $\phi_{SRE}$, long run emphasis $\phi_{LRE}$, run-length nonuniformity $\phi_{RLN}$, and run percentage $\phi_{RP}$, that are extracted from CRF vector 138 and provided to a machine learning classifier 160. The machine learning classifier 160 then computes a probability, based at least in part, on the set of CRF features 150, that the region of tissue represented in image 110 will experience disease progression.

Example methods and apparatus demonstrably improve on conventional technologies for predicting cancer progression by both reducing computational complexity and increasing predictive accuracy. For example, embodiments described herein predict OP-SCC progression with an average AUC of at least 0.76, compared with conventional predictive techniques that employ other types of features. For instance, conventional approaches that employ global and local cell graph features, nuclear shape, or a deep learning classifier yielded corresponding AUC values of 0.71, 0.68, 0.51, and 0.56 respectively. Example embodiments also stratify progressor versus non-progressor patients based on the predicted labels obtained from methods and apparatus described herein with statistical significance in a Kaplan-Meier (KM) survival curve analysis, with p-value=0.00015, Hazard ratio=4.6601, and a 95% confidence interval: 2.1835-9.9459.

By increasing the accuracy with which cancer progression is predicted, example methods and apparatus produce the concrete, real-world technical effect of increasing the probability that at-risk patients receive timely treatment tailored to the particular pathology they exhibit. The additional technical effect of reducing the expenditure of resources and time on patients who have a less aggressive pathology is also achieved. Example embodiments further improve on conventional approaches by providing a more accurate second reader to facilitate the reduction of inter-reader and intra-reader variability among human radiologists or oncologists.

Example methods and apparatus thus improve on conventional methods in a measurable, clinically significant way. When implemented as part of a personalized medicine system, a computer assisted diagnostic (CADx) system, or an OP-SCC progression prediction system which may include a computer or a processor configured to predict disease progression, example embodiments improve the performance of a machine, computer, or computer-related technology by providing a more accurate and more reliable prediction of disease progression compared to conventional approaches to controlling a machine to predict disease progression.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
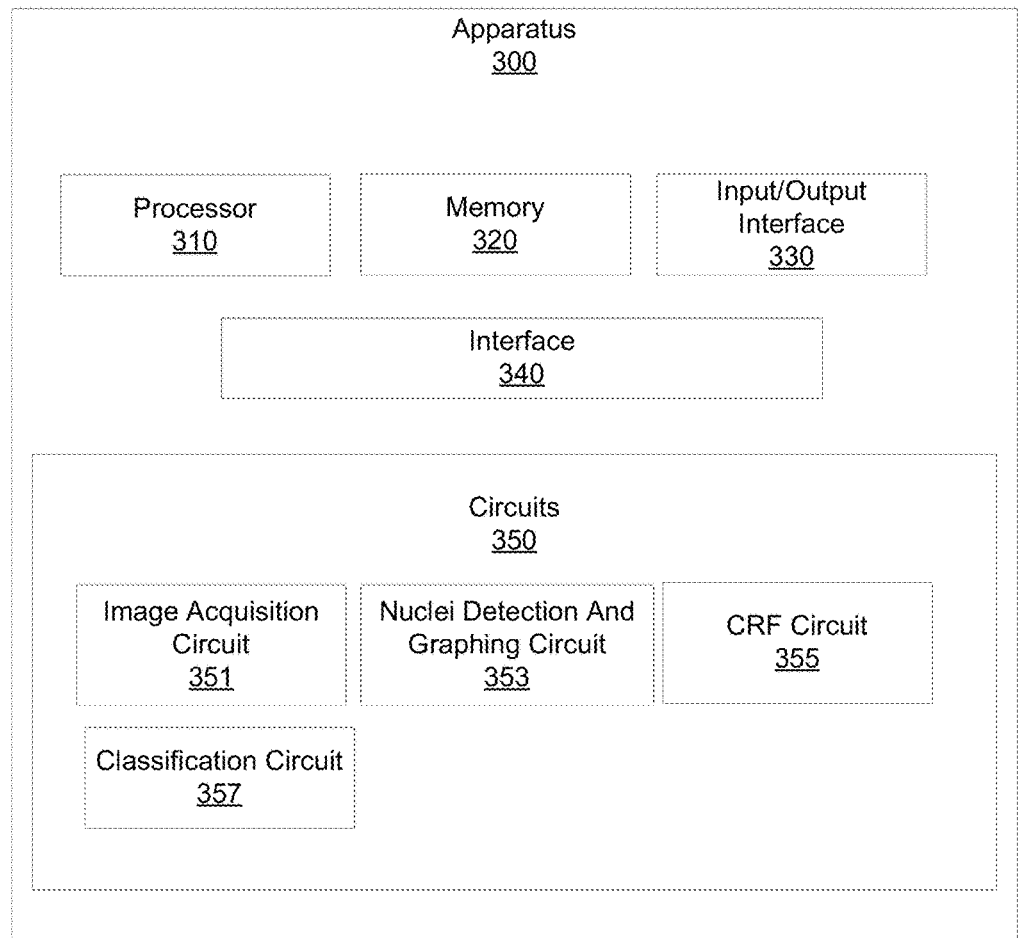
FIG. 3 illustrates an example apparatus that predicts cancer progression.

FIG. 3 illustrates an example apparatus 300 that predicts cancer progression. In one embodiment, apparatus 300 predicts p16+ OP-SCC progression. Apparatus 300 includes a processor 310. Apparatus 300 also includes a memory 320. Processor 310 may, in one embodiment, include circuitry such as, but not limited to, one or more single-core or multi-core processors. Processor 310 may include any combination of general-purpose processors and dedicated processors (e.g., graphics processors, application processors, etc.). The processors may be coupled with or may include memory (e.g. memory 320) or storage and may be configured to execute instructions stored in the memory or storage to enable various apparatus, applications, or operating systems to perform the operations. Memory 320 is configured to store a digitized image of a region of tissue demonstrating cancerous pathology. Apparatus 300 also includes an input/output (I/O) interface 330. Apparatus 300 also includes a set of circuits 350. The set of circuits 350 includes an image acquisition circuit 351, a nuclei detection and graphing circuit 353, a cell run-length feature (CRF) circuit 355, and a classification circuit 357. Apparatus 300 further includes an interface 340 that connects the processor 310, the memory 320, the I/O interface 330, and the set of circuits 350.

Image acquisition circuit 351 is configured to access an image of a region of tissue demonstrating cancerous pathology. The image includes a representation of at least one cellular nucleus. The image includes a plurality of pixels, a pixel having an intensity. Accessing the image includes acquiring electronic data, reading from a computer file, receiving a computer file, reading from a computer memory, or other computerized activity. In another embodiment, accessing the image may include accessing a network attached storage (NAS), a cloud storage system, or other type of electronic storage system. Accessing the image may, in one embodiment, include accessing a NAS device, a cloud storage system, or other type of electronic storage system using input/output interface 330. In one embodiment, the image is a digitized image of a tissue micro array (TMA) of a hematoxylin and eosin (H&E) stained pathology slide of a region of tissue demonstrating p16+ oropharyngeal squamous cell cancer scanned at 40× magnification with a resolution of 0.25 µm per pixel image. In another embodiment, other imaging approaches or parameters may be used to generate and access the image accessed by image acquisition circuit 351.

Nuclei detection and graphing circuit 353 is configured detect a plurality of cellular nuclei represented in the image. In one embodiment, nuclei detection and graphing circuit 353 is configured to detect the plurality of cellular nuclei represented in the image using a generalized Laplacian of Gaussian (gLoG) detection approach. In one embodiment, nuclei detection and graphing circuit 353 is configured to first generate a bank of gLoG kernels with different scales and orientations. The gLoG kernels are then convolved with the underlying image to obtain a set of response maps. The local maxima on each of the response maps, or on a threshold number of the response maps, are then identified and merged if they are found to be proximal to each other. The level of proximity may be user defined, may be defined as a function of the type of pathology represented in the image, or may be defined to optimize computational efficiency or predictive accuracy. The maximum response within each group is finally identified as the seed point. In another embodiment, nuclei detection and graphing circuit 353 may be configured to use other, different nuclei detection techniques, including multi-pass adaptive voting, a radial symmetry transform, or a multiscale Laplacian of Gaussian filter.

Nuclei detection and graphing circuit 353 is also configured to construct a nuclear sub-graph based on the plurality of cellular nuclei. A node of the sub-graph is a nuclear centroid of a member of the plurality of cellular nuclei. In one embodiment, nuclei detection and graphing circuit 353 is configured to construct the nuclear sub-graph based on a probabilistic decaying function of the Euclidean distance between a first nuclear centroid of a first member of the plurality of cellular nuclei, and a second, different nuclear centroid of a second, different member of the plurality of cellular nuclei.

For example, in one embodiment, pairwise spatial relationships between cells are defined via localized sub-graphs. A graph G may be defined as $G=\{V_G, E_G\}$, where $V_G$ represents the set of n nuclear centroids, $\gamma_i$, $\gamma_j \in V_G$, i, j∈{1, 2, ..., 0} as nodes, and $E_G$ represents the set of edges which connect the nodes. The edges between pairs of nodes $\gamma_i$, $\gamma_j$ are computed via the following probabilistic decaying function: $D=\{(i, j): r<d(i, j)^{-\alpha}, \forall \gamma_i, \gamma_j \in V\}$, where d(i,j) represents the Euclidean distance between $\gamma_i$ and $\gamma_j$. In this embodiment, α≥0 controls the density of the graph, where α approaching 0 represents a high probability of connecting nodes while α approaching ∞ conversely represents a low probability of connecting nodes. r∈[0, 1] is an empirically determined edge threshold. In one embodiment, α or r∈[0, 1] may be user defined, may be pre-set, may be automatically defined, may be defined for different pathologies being investigated, or may be defined as a function of computational efficiency or predictive accuracy.

CRF circuit 355 is configured to compute a CRF vector based on the sub-graph generated by nuclei detection and graphing circuit 353. The CRF vector expresses the number of cell runs associated with different length cell runs in the nuclear sub-graph. A cell run is defined as a single traverse from a first end point to a second, different end point of the nuclear sub-graph. A length is defined as the total number of nodes traversed in the cell run.

Figure 2:
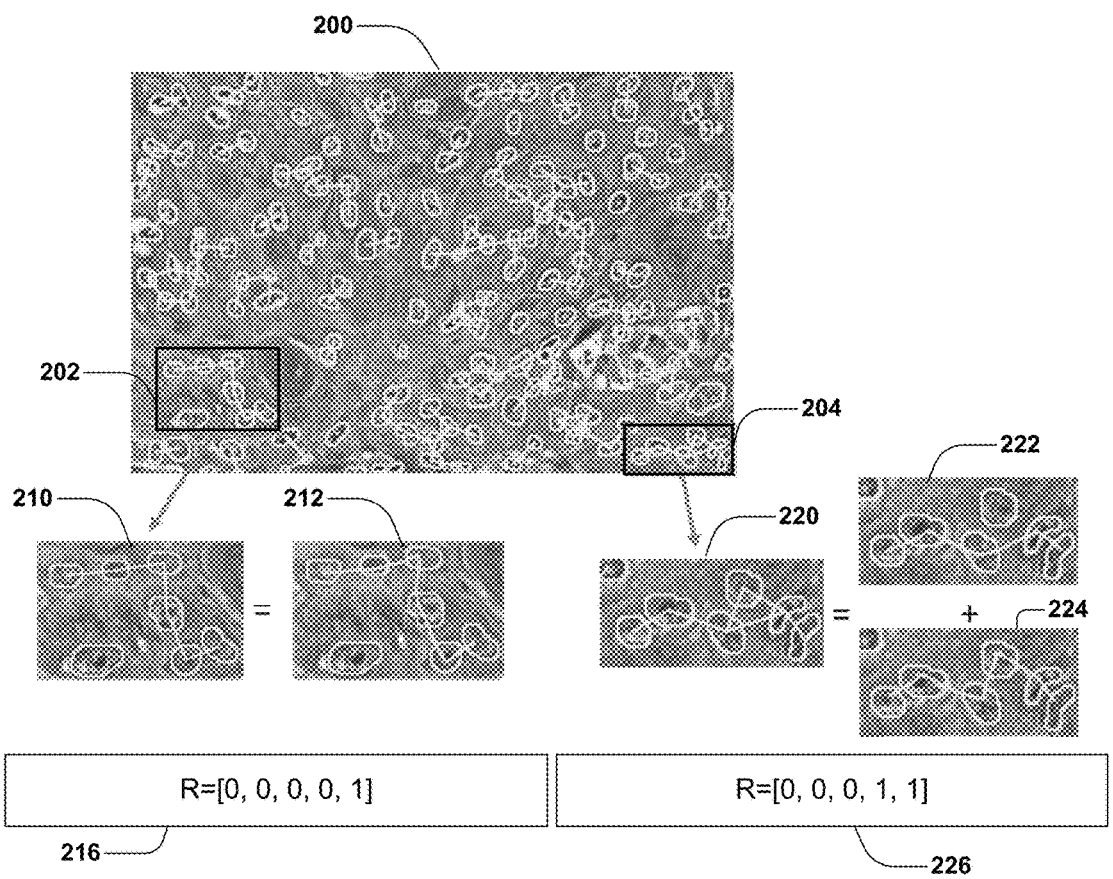
FIG. 2 is a schematic overview of a workflow for generating a CRF vector.

For example, in one embodiment, for every nuclear sub-graph generated from the image by nuclei detection and graphing circuit 353, or for a threshold number of nuclear sub-graphs (e.g., 50%, 75%), a cell run-length vector is computed. FIG. 2 illustrates an example H&E stained image 200 of a region of tissue demonstrating OP-SCC. An example cell graph 202 including 6 cells is generated from the image 200, where each vertex represents a cell. A magnified version of cell graph 202 is illustrated at 210. A cell run is defined as a single traverse from an end point of a cell graph to the other. The length of run is defined as the total number of nodes/cells being traversed in a run. In this example a length of n runs is denoted as n-runs. The corresponding run length vector 216 is defined as the number of cell runs associated with different length of runs.

The run length vector accounts for the possible runs in a cell graph, and hence reflects the complexity of a cell graph. In the example shown in FIG. 2, the length of runs is numbered from 2 to 6, so that the run-length vector 216 is R=[0,0,0,0,1]. Another example of a local cell graph 204 is illustrated. An enlarged version of cell graph 204 is shown at 220. Cell graph 204, like cell graph 202, also consists of 6 nuclei/nodes. However, cell graph 204 contains one 5-run and one 6-run, and the corresponding run-length vector 226 is therefore R=[0,0,0,1,1]. In terms of the total number of cell runs, the cell graph 204 is thus more complex compared to cell graph 202. While in this example a run-length vector that records the number of 2 to 6 runs is described, other run-length vectors may be defined that have a greater or smaller number of elements.

CRF circuit 355 is also configured to compute a set of CRF features based on the CRF vector and the sub-graph. In one embodiment, the set of CRF features includes a short run emphasis feature, a long run emphasis feature, a run-length non-uniformity feature, and a run percentage feature.

In one embodiment, the total number of cells in a cell graph is denoted as $n_c$. A specific length of run as is denoted as r, and the corresponding number of runs is denoted as R(r). In this example, the total number of runs in the run-length vector is denoted as $$n_r = \sum_r R(r).$$

In one embodiment, four features: short run emphasis $\phi_{SRE}$, long run emphasis $\phi_{LRE}$, run-length nonuniformity $\phi_{RLN}$, run percentage $\phi_{RP}$, are extracted from the cell run-length vector. The four features are defined as follows:

Short run emphasis:

$$\phi_{SRE} = \frac{1}{n_r} \sum_r (R(r)/r^2),$$

Long run emphasis:

$$\phi_{LRE} = \frac{1}{n_r} \sum_r (R(r) \times r^2),$$

Run-length nonuniformity:

$$\phi_{RLN} = \frac{1}{n_r} \sum_r R(r)^2,$$

Run percentage:

$$\phi_{RP} = \frac{n_r}{n_c}.$$

The short run emphasis $\phi_{SRE}$ emphasizes the shorter cell runs in a cell graph. If one cell graph contains a larger number of shorter runs compared to longer runs, $\phi_{SRE}$ will be large. In contrast, the long run emphasis $\phi_{LRE}$ places more importance on longer cell runs compared to shorter ones. If one cell graph contains more long runs compared to shorter ones, $\phi_{LRE}$ will be large. The run-length non-uniformity $\phi_{RLN}$ is determined by the distribution of cell runs in the run-length vector. The run-length non-uniformity $\phi_{RLN}$ reaches its lower bound while the cell runs are evenly distributed over all run-lengths. Computing the run percentage $\phi_{RP}$ involves calculating the average cell runs for each cell in the cell graph. If a cell graph has a complex spatial arrangement, the value of $\phi_{RP}$ will be large. In another embodiment, the set of CRF features may include other, different features.

For example, different feature selection methods may be employed to select the CRF features that most predict of survival outcomes within the training folds. In one embodiment, three feature selection methods may be considered: a Minimum redundancy, maximum relevance (MRMR) feature selection method, a Wilcoxon rank sum test (WRST), or a Random Forests (RF) feature selection method. Each feature selection method may be employed in conjunction with a 5-fold cross-validation scheme and run over 100 iterations to identify the CRF features that maximally distinguished two groups of patients (e.g., progressors, non-progressors), while minimizing intra-feature correlation.

CRF circuit 355 is further configured to generate a CRF signature. The CRF signature is based, at least in part, on the set of CRF features. An image may include several nuclear sub-graphs. Thus, in one embodiment, CRF circuit 355 is configured to employ first order statistics, including mean, standard deviation, kurtosis, skewness, and range, to obtain a final CRF signature for the entire image that reflects local sub-graph architectural complexity. Therefore, in this example, for an image, CRF circuit 355 is configured to generate the CRF signature from a total of 20 CRF features. In another embodiment, a greater or smaller number of first order statistics may be employed to generate the CRF signature.

Classification circuit 357 is configured to compute a probability that the region of tissue will experience cancer progression. Classification circuit 357 computes the probability based, at least in part, on the CRF signature. In one embodiment, classification circuit 357 is configured as a machine learning classifier. For example, classification circuit 357 may be configured as a linear discriminant analysis (LDA) classifier, a quadratic discriminant analysis (QDA) classifier, a support vector machine (SVM) classifier, or a random forest (RF) classifier. In one embodiment, classification circuit 357 is configured as an LDA classifier and provided with a CRF signature derived from CRF features selected using a WRST feature selection method. In another embodiment, classification circuit 357 is configured to compute a second probability that the region of tissue will experience recurrence.

Classification circuit 357 is also configured to generate a classification of the region of tissue as a progressor or non-progressor. Classification circuit 357 generates the classification based, at least in part, on the probability. Apparatus 300, including classification circuit 357, CRF circuit 355, and nuclei and graphing circuit 353, resolve features extracted from the image at a higher order or higher level than a human can resolve in the human mind or with pencil and paper. For example, the nuclear sub-graphs are not biological properties of cancerous tissue that a human eye can perceive. The CRF signature provided to the machine learning classifier is of a different nature than the nuclei represented in the image. A region of tissue demonstrating OP-SCC in a patient does not comprise, for example, a graph. The probability computed by classification circuit 357 and the classification are of a fundamentally different nature than the underlying tissue or the nuclear sub-graph. In another embodiment, classification circuit 357 is further configured to generate a classification of the region of tissue as likely to experience recurrence or unlikely to experience recurrence.

Figure 4:
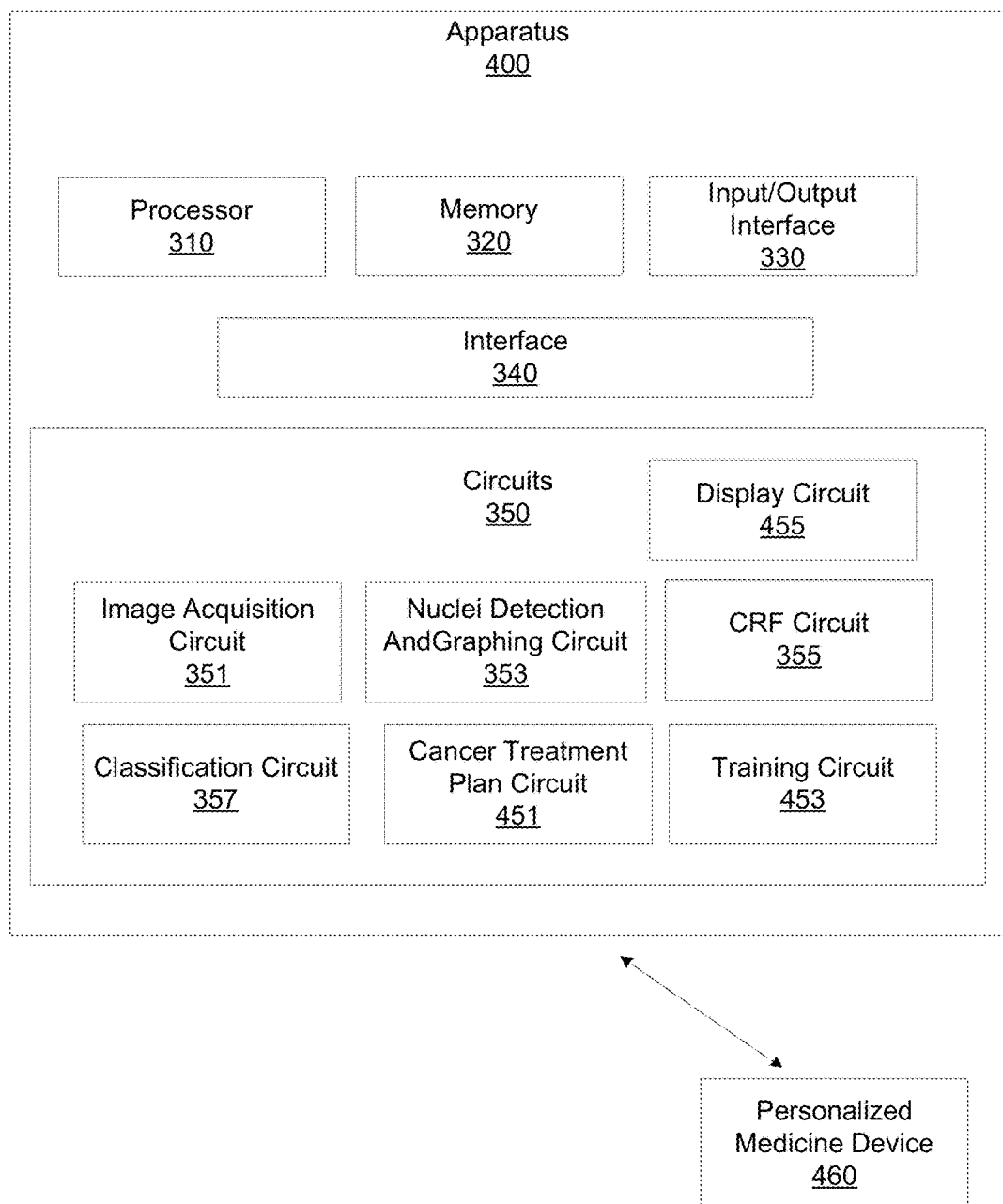
FIG. 4 illustrates an example apparatus that predicts cancer progression.

FIG. 4 illustrates an example apparatus 400 that is similar to apparatus 300 but that includes additional details and elements. In one embodiment of apparatus 400, the set of circuits 350 further includes a cancer treatment plan circuit 451. Cancer treatment plan circuit 451 is configured to generate a cancer treatment plan for the patient of which the image was acquired based, at least in part, on the classification, and at least one of the probability, the CRF signature, the CRF vector, or the image. Defining a personalized cancer treatment plan facilitates delivering a particular treatment that will be therapeutically active to the patient, while minimizing negative or adverse effects experienced by the patient. For example, the cancer treatment plan may define an immunotherapy agent dosage or schedule, or a chemotherapy agent dosage or schedule, for a patient identified as a progressor, while for a non-progressor other treatments may be suggested.

In another embodiment, apparatus 400 may control a computer aided diagnosis (CADx) system to classify the region of tissue represented in the image based, at least in part, on the probability or the classification generated by classification circuit 357. In other embodiments, other types of CADx systems may be controlled, including CADx systems for predicting recurrence or progression in other tissue presenting other, different pathologies that may be distinguished based on cell run length features. For example, embodiments described herein may be employed to predict disease progression or recurrence based on probabilities computed from cell run length features by a machine learning classifier in breast cancer (BCa), kidney disease, prostate cancer, lung cancer, or brain pathologies.

In another embodiment of apparatus 400, the set of circuits 350 further includes a training circuit 453 configured to train classification circuit 357. Training classification circuit 357 may include training a machine learning classifier. In one embodiment, training circuit 453 is configured to access a dataset of digitized images of a region of tissue demonstrating OP-SCC. The dataset of digitized images includes, in this example, a single randomly selected TMA core chosen to represent each patient in a retrospective tissue microarray cohort including one hundred and sixty (160) p16 positive OP-SCC patients. The one hundred and sixty cases consisted of twenty patients with progressive (local, nodal, and/or distant) disease and one hundred and forty (140) who presented with non-progressive disease during a clinical follow up period. In this embodiment, four different machine learning classifiers, including an LDA classifier, a QDA classifier, an SVM classifier, and a random forest (RF) classifier were implemented and trained based on the patient labels, under 5-fold cross-validation (CV) with one hundred (100) runs. Three different feature selection methods were implemented to select the CRF features most predictive of survival outcomes within the training folds. The three feature selection methods were: a Minimum redundancy, maximum relevance (MRMR) feature selection method, a Wilcoxon rank sum test (WRST), and a Random Forests (RF) feature selection method. Each feature selection method was employed in conjunction with a 5-fold CV scheme and run over one hundred (100) iterations to identify the CRF features that maximally distinguished two groups of patients, while minimizing intra-feature correlation.

FIG. 4 further illustrates a personalized medicine device 460. Personalized medicine device 460 may be, for example, a CADx system, an OP-SCC progression prediction system, an OP-SCC recurrence prediction system, or other type of personalized medicine device that may be used to facilitate the prediction of cancer progression or recurrence. In one embodiment, the cancer treatment plan circuit 451 may control personalized medicine device 460 to display the classification, the probability, the CRF signature, the CRF vector, the cancer treatment plan, or the image on a computer monitor, a smartphone display, a tablet display, or other displays.

In one embodiment of apparatus 400, the set of circuits 350 further includes a display circuit 455. The display circuit 455 may control the cancer treatment plan circuit 451 or a CADx system to display the classification, the probability, the CRF signature, the CRF vector, the cancer treatment plan, or the image on a computer monitor, a smartphone display, a tablet display, or other displays. Displaying the classification, the probability, the CRF signature, the CRF vector, the cancer treatment plan, or the image may also include printing the classification, the probability, the CRF signature, the CRF vector, the cancer treatment plan, or the image. Display circuit 455 may also control the CADx system to display operating parameters or characteristics of the classification circuit 357, including a machine learning classifier, during both training and testing, and during clinical operation. Displaying the classification, the probability, the CRF signature, the CRF vector, the cancer treatment plan, or the image involves but is not limited to extracting and changing the character of information present in a region of tissue (e.g. biological tissue), to a histological image (e.g. digitized image of H&E slide), to changing the information present in the image to information of a different character in the cell run-length features, the probability, the characterization, and the cancer treatment plan. Embodiments described herein further transform the character of information to information suitable for display on, for example, a computer monitor, a smartphone display, a tablet display, or other displays. Thus, embodiments described herein use a combined order of specific rules, elements, or components that render information into a specific format that is then used and applied to create desired results more accurately and with greater reliability than conventional approaches.

Figure 5:
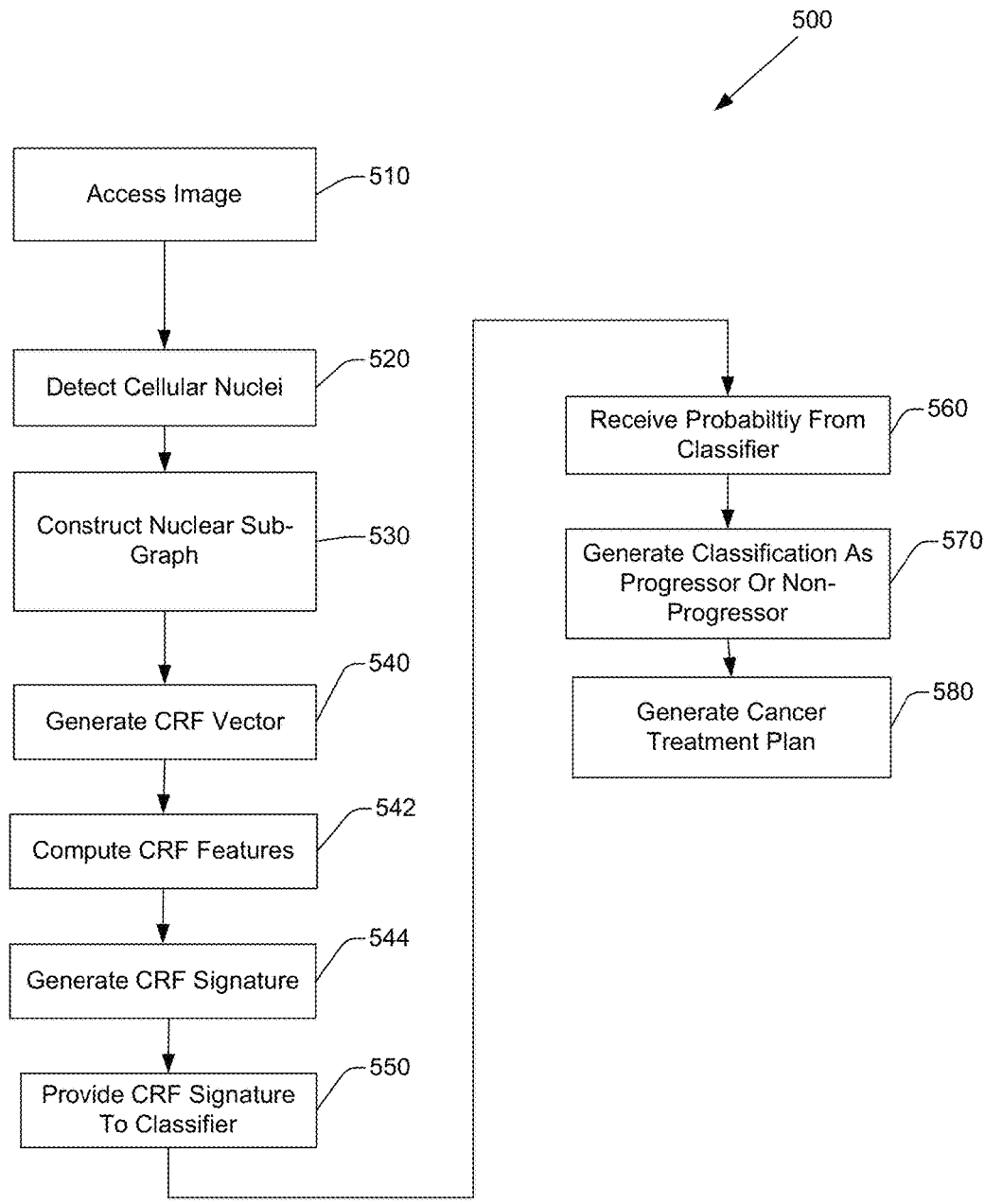
FIG. 5 illustrates an example method for predicting cancer progression.

FIG. 5 illustrates a computerized method 500 for predicting cancer progression. Method 500 includes, at 510, accessing a region of tissue demonstrating cancerous pathology. In one embodiment, the image is a digitized image of a TMA of an H&E stained pathology slide of a region of tissue demonstrating p16+ oropharyngeal squamous cell cancer scanned at 40× magnification with a resolution of 0.25 μm per pixel. Accessing the image includes acquiring electronic data, reading from a computer file, receiving a computer file, reading from a computer memory, or other computerized activity. In other embodiments, the image may be of other, different types of tissue demonstrating other, different pathologies imaged using different imaging techniques or parameters. For example, in one embodiment, the image is a digitized whole slide image (WSI) of a region of tissue demonstrating cancerous pathology.

Method 500 also includes, at 520, detecting a plurality of cellular nuclei represented in the image. A cellular nuclei has a centroid. In one embodiment, the plurality of cellular nuclei are detected using a generalized Laplacian of Gaussian (gLoG) detection approach. In another embodiment, the plurality of cellular nuclei are detected using including multi-pass adaptive voting, a radial symmetry transform, or a multiscale Laplacian of Gaussian filter.

Method 500 also includes, at 530, constructing a nuclear sub-graph. The nuclear sub-graph is based on the plurality of cellular nuclei. A node of the sub-graph is a nuclear centroid of a member of the plurality of cellular nuclei. In one embodiment, the nuclear sub-graph is constructed based on a probabilistic decaying function of the Euclidean distance between a first nuclear centroid of a first member of the plurality of cellular nuclei, and a second, different nuclear centroid of a second, different member of the plurality of cellular nuclei. The density of the nuclear sub-graph may user defined, may be defined as a function of a desired predictive accuracy or computational complexity, may be defined as a function of a type of pathology represented in the image, or may be pre-set.

Method 500 also includes, at 540, generating a cell run-length feature (CRF) vector. The CRF vector is based on the sub-graph. In one embodiment, the CRF vector is defined as the number of cell runs associated with different length cell runs in the nuclear sub-graph. A cell run is defined as a single traverse from a first end point to a second, different end point of the nuclear sub-graph. A length is defined as the total number of nodes traversed in the cell run.

Method 500 also includes, at 542, computing a set of CRF features. The set of CRF features is based on the CRF vector and the sub-graph. In one embodiment, the set of CRF features includes at least four CRF features, including a short run emphasis feature, a long run emphasis feature, a run-length non-uniformity feature, and a run percentage feature. In another embodiment, the set of CRF features includes other, different features. In one embodiment, the set of CRF features is selected using an MRMR feature selection method, a WRST, or an RF feature selection method.

Method 500 also includes, at 544, generating a CRF signature. The CRF signature is based, at least in part, on the set of CRF features. In one embodiment, generating the CRF signature includes computing, for the image, a set of first order statistics based on the set of CRF features. In this embodiment, the set of first order statistics include a mean, a standard deviation, a kurtosis, a skewness, and a range. In another embodiment, other first order statistics may be employed to generate the CRF signature.

Method 500 also includes, at 550, providing the CRF signature to a machine learning classifier. Providing the CRF signature to the machine learning classifier may include acquiring electronic data, reading from a computer file, receiving a computer file, reading from a computer memory, or other computerized activity. In one embodiment, the machine learning classifier is an LDA classifier, a QDA classifier, an SVM classifier, or an RF classifier. In another embodiment, the machine learning classifier may be another, different type of machine learning classifier. In one embodiment, method 500 further includes training the machine learning classifier. In another embodiment, method 500 further includes testing the machine learning classifier on a held-out testing dataset.

Method 500 also includes, at 560, receiving, from the machine learning classifier, a probability that the region of tissue will experience cancer progression. The machine learning classifier computes the probability based, at least in part, on the CRF signature. Receiving the probability from the machine learning classifier may include acquiring electronic data, reading from a computer file, receiving a computer file, reading from a computer memory, or other computerized activity. In another embodiment, the machine learning classifier computes a second probability that the region of tissue will experience cancer recurrence based, at least in part, on the CRF signature.

Method 500 also includes, at 570, generating a classification by classifying the region of tissue as a progressor or non-progressor. The classification is based, at least in part, on the probability. In one embodiment, classifying the region of tissue as a a progressor or non-progressor may include classifying the region as a progressor when the machine learning classifier provides a probability of 0.5 or greater. In another embodiment, classifying the region of tissue as a progressor may be based on other probability values (e.g., 0.6, 0.7). In another embodiment, classifying the region of tissue may include categorizing the region of tissue based on more than two categories. For example, the region of tissue may be classified as one of "progressor", "unknown", or "non-progressor" based on the probability. Other categorization schemes may be employed. In one embodiment, method 500 generates a classification of the region of tissue as likely to experience recurrence, or not likely to experience recurrence based, at least in part, on the second probability.

Method 500 further includes, at 580, generating a cancer treatment plan. The cancer treatment plan is based, at least in part, on the classification, and at least one of the probability, the CRF signature, or the image. In one embodiment, the cancer treatment plan defines an immunotherapy agent dosage or schedule. In one embodiment, method 500 further includes displaying the cancer treatment plan, the classification, the probability, the CRF signature, the CRF vector, the set of CRF features, or the image. In one embodiment, method 500 further includes controlling a personalized medicine system or CADx system to display the cancer treatment plan. In this embodiment, method 500 may include controlling the personalized medicine system or CADx system to display the cancer treatment plan, the classification, the probability, the CRF signature, the CRF vector, the set of CRF features, or the image.

Figure 6:
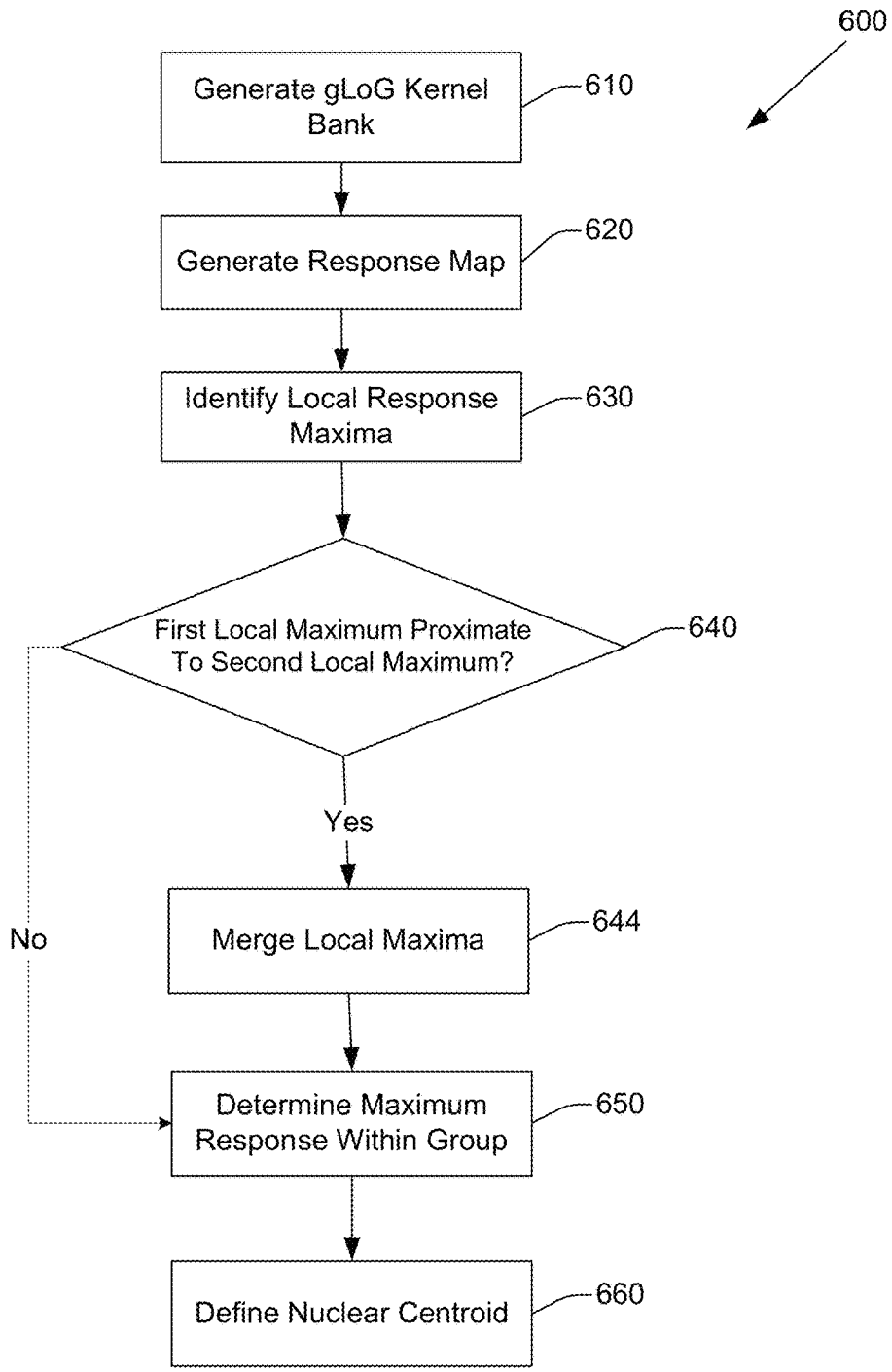
FIG. 6 illustrates an example method for detecting cellular nuclei.

FIG. 6 illustrates an example computerized method 600 for detecting a cellular nuclei using a generalized Laplacian of Gaussian (gLoG) detection approach suitable for implementation with embodiments described herein. Method 600 may be implemented as part of method 500, by apparatus 300 or apparatus 400, or by other embodiments described herein. Method 600 includes, at 610 generating a bank of gLoG kernels. The bank of gLoG kernels includes at least two gLoG kernels. A first member of the bank of gLoG kernels has a first scale and a first orientation. A second, different member of the bank of gLoG kernels has a second, different scale or a second, different orientation.

Method 600 also includes, at 620, generating a response map by convolving the bank of gLoG kernels with the image. In one embodiment, each kernel is slid across the whole image and convolution computations are performed locally to generate the response map. An aggregated response map is then obtained by summing up all the responses obtained across the whole image.

Method 600 also includes, at 630, identifying a local maximum of the response map. In one embodiment, identifying a local maximum includes searching for the local maxima from the aggregated response map and filtering out false local maxima using a local thresholding method. This approach mitigates intensity variation and local noise related issues, thereby improving on conventional approaches.

Method 600 also includes, at 640, determining if a first local maximum is proximal to at least one different local maximum. Upon determining that a first local maximum is proximal to other different local maxima, method 600 further includes, at 644, merging the first local maximum with other different local maxima. The proximity between two local maxima is defined by a pre-set threshold. This threshold is set based on the statistical measure (e.g., mean) of the diameter of cancer cells for the type of pathology being analyzed. The local maxima that fall within the proximity threshold form a group of local maxima.

Method 600 also includes, at 650, determining a maximum response within a group of maxima within a local region. The location of the final maximum is set to the mean location among the corresponding group of maxima.

Upon determining the maximum response within the group of maxima, method 600 further includes, at 660, defining the maximum response as the nuclear centroid.

Improved identification or classification of patients who will experience disease progression or recurrence may produce the technical effect of improving treatment efficacy by increasing the accuracy of and decreasing the time required to treat patients demonstrating OP-SCC or other forms of cancerous pathology. Treatments and resources, including expensive immunotherapy agents, may be more accurately tailored to patients with a likelihood of benefiting from said treatments and resources, including responding to immunotherapy, so that more appropriate treatment protocols may be employed, and expensive resources are not wasted. Controlling a personalized medicine system, a CADx system, or a cancer progression or recurrence prediction system based on improved identification or classification of patients who will experience progression or recurrence further improves the operation of the system, since unnecessary operations will not be performed.

Using a more appropriately modulated treatment may lead to less aggressive therapeutics being required for a patient or may lead to avoiding or delaying a biopsy, a resection, or other invasive procedure. When patients experiencing OP-SCC who will more likely experience progression or recurrence are more quickly and more accurately distinguished from patients who will not, patients most at risk may receive a higher proportion of scarce resources (e.g., therapeutics, physician time and attention, hospital beds) while those less likely to benefit from the treatment may be spared unnecessary treatment, which in turn spares unnecessary expenditures and resource consumption. Example methods, apparatus, and other embodiments may thus have the additional effect of improving patient outcomes compared to conventional approaches.

While FIGS. 5 and 6 illustrate various actions occurring in serial, it is to be appreciated that various actions illustrated in FIG. 5 could occur substantially in parallel. By way of illustration, a first process could involve detecting cellular nuclei, a second process could involve constructing a nuclear sub-graph and a third process could involve generating a CRF vector. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage device may store computer executable instructions that if executed by a machine (e.g., computer, processor) cause the machine to perform methods described or claimed herein including method 500 and method 600. While executable instructions associated with the listed methods are described as being stored on a computer-readable storage device, it is to be appreciated that executable instructions associated with other example methods described or claimed herein may also be stored on a computer-readable storage device. In different embodiments the example methods described herein may be triggered in different ways. In one embodiment, a method may be triggered manually by a user. In another example, a method may be triggered automatically.

Figure 7:
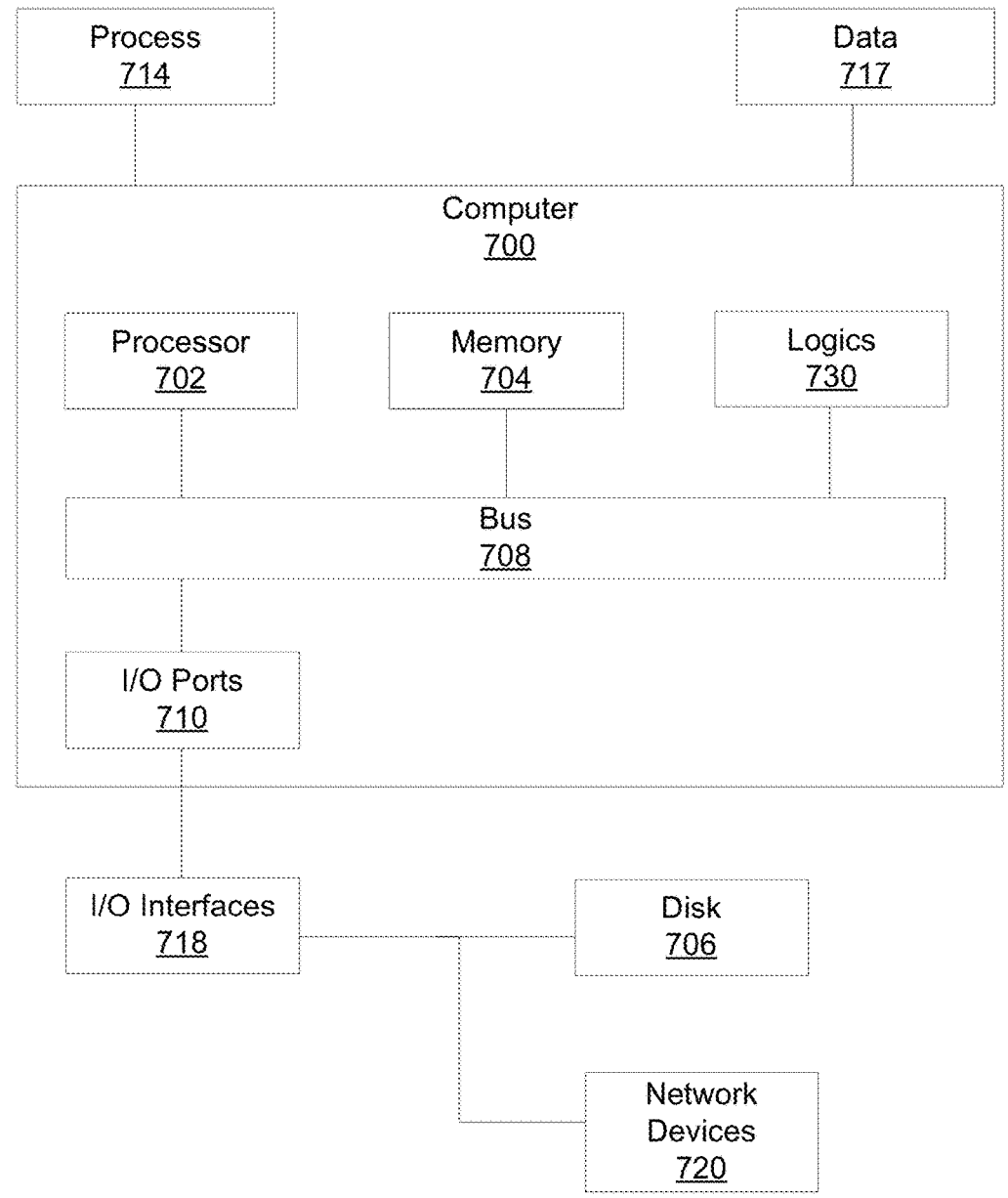
FIG. 7 illustrates an example computer in which example embodiments described herein may operate.

FIG. 7 illustrates an example computer 700 in which example methods illustrated herein can operate and in which example methods, apparatus, circuits, operations, or logics may be implemented. In different examples, computer 700 may be part of a personalized medicine system, a cancer progression or recurrence prediction system, a digital whole slide scanner, a CT system, may be operably connectable to a CT system, an MRI system, a personalized medicine system, or a digital whole slide scanner, or may be part of a CADx system.

Computer 700 includes a processor 702, a memory 704, and input/output (I/O) ports 710 operably connected by a bus 708. In one example, computer 700 may include a set of logics or circuits 730 that perform a method of predicting cancer progression or recurrence using a machine learning classifier. Thus, the set of circuits 730, whether implemented in computer 700 as hardware, firmware, software, and/or a combination thereof may provide means (e.g., hardware, firmware, circuits) for predicting cancer progression or recurrence based on cell run-length features and a machine learning classifier. In different examples, the set of circuits 730 may be permanently and/or removably attached to computer 700.

Processor 702 can be a variety of various processors including dual microprocessor and other multi-processor architectures. Processor 702 may be configured to perform steps of methods claimed and described herein. Memory 704 can include volatile memory and/or non-volatile memory. A disk 706 may be operably connected to computer 700 via, for example, an input/output interface (e.g., card, device) 718 and an input/output port 710. Disk 706 may include, but is not limited to, devices like a magnetic disk drive, a tape drive, a Zip drive, a flash memory card, or a memory stick. Furthermore, disk 706 may include optical drives like a CD-ROM or a digital video ROM drive (DVD ROM). Memory 704 can store processes 714 or data 717, for example. Data 717 may, in one embodiment, include digitized CT images of a region of tissue demonstrating NSCLC. Disk 706 or memory 704 can store an operating system that controls and allocates resources of computer 700.

Bus 708 can be a single internal bus interconnect architecture or other bus or mesh architectures. While a single bus is illustrated, it is to be appreciated that computer 700 may communicate with various devices, circuits, logics, and peripherals using other buses that are not illustrated (e.g., PCIE, SATA, Infiniband, 1394, USB, Ethernet).

Computer 700 may interact with input/output devices via I/O interfaces 718 and input/output ports 710. Input/output devices can include, but are not limited to, CT systems, MRI systems, digital whole slide scanners, an optical microscope, a keyboard, a microphone, a pointing and selection device, cameras, video cards, displays, disk 706, network devices 720, or other devices. Input/output ports 710 can include but are not limited to, serial ports, parallel ports, or USB ports.

Computer 700 may operate in a network environment and thus may be connected to network devices 720 via I/O interfaces 718 or I/O ports 710. Through the network devices 720, computer 700 may interact with a network. Through the network, computer 700 may be logically connected to remote computers. The networks with which computer 700 may interact include, but are not limited to, a local area network (LAN), a wide area network (WAN), or other networks, including the cloud.

Examples herein can include subject matter such as an apparatus, a personalized medicine system, a CADx system, a processor, a system, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for predicting cancer progression or recurrence according to embodiments and examples described.

One example embodiment includes a computer-readable storage device storing computer-executable instructions that, in response to execution, cause a cancer progression or recurrence prediction system, a personalized medicine system, or a processor, to perform operations. The operations may include accessing an image of a region of tissue demonstrating cancerous pathology, where the image includes a plurality of pixels, a pixel having an intensity. The image may be an image of a region of tissue demonstrating OP-SCC, or other type of cancer.

A cancer progression or recurrence prediction system, a personalized medicine system, or a processor may include circuitry such as, but not limited to, one or more single-core or multi-core processors. A processor(s) may include any combination of general-purpose processors and dedicated processors (e.g., graphics processors, application processors, etc.). The processors may be coupled with or may include memory or storage and may be configured to execute instructions stored in the memory or storage to enable various apparatus, applications, or operating systems to perform the operations. The memory or storage devices may include main memory, disk storage, or any suitable combination thereof. The memory or storage devices may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The operations may also include detecting a plurality of cellular nuclei represented in the image. In one embodiment, the operations include detecting the plurality of cellular nuclei using a gLoG detection approach. In another embodiment, the operations include detecting the plurality of cellular nuclei using multi-pass adaptive voting, a radial symmetry transform, or a multiscale Laplacian of Gaussian filter.

The operations may also include constructing a nuclear sub-graph based on the plurality of cellular nuclei. A node of the sub-graph is a nuclear centroid of a member of the plurality of cellular nuclei. In one embodiment, the operations include constructing the nuclear sub-graph based on a probabilistic decaying function of the Euclidean distance between a first nuclear centroid of a first member of the plurality of cellular nuclei, and a second, different nuclear centroid of a second, different member of the plurality of cellular nuclei.

The operations may also include computing a cell run-length feature (CRF) vector based on the sub-graph.

The operations may also include computing a set of CRF features based on the CRF vector and the sub-graph. In one embodiment, the set of CRF features includes at least four CRF features, including a short run emphasis feature, a long run emphasis feature, a run-length non-uniformity feature, and a run percentage feature.

The operations may also include generating a CRF signature based, at least in part, on the set of CRF features. In one embodiment, generating the CRF signature includes computing, for the image, a set of first order statistics based on the set of CRF features. In this embodiment, the set of first order statistics include a mean, a standard deviation, a kurtosis, a skewness, and a range.

The operations may also include computing a probability that the region of tissue will experience cancer progression based, at least in part, on the CRF signature. Computing the probability may include, in one embodiment, providing the CRF signature to a machine learning classifier. The machine learning classifier may be an SVM, a QDA classifier, an LDA classifier, a random forests classifier, or other type of machine learning classifier. In this embodiment, the machine learning classifier computes a probability that the region of tissue will experience progression or non-progression based, at least in part on the CRF signature. In one embodiment, the operations further include training the machine learning classifier. In one embodiment, the operations further include testing the machine learning classifier on a held-out testing dataset. In another embodiment, the operations may include computing a second probability that the region of tissue will experience cancer recurrence based, at least in part on the CRF signature.

The operations may also include generating a classification by classifying the region of tissue as a progressor or non-progressor based, at least in part, on the probability. In one embodiment, the region of tissue is classified as a progressor when the probability has a value of 0.5 or greater. In another embodiment, the region of tissue is classified as a progressor when the probability has another, different value. In one embodiment, the region of tissue is classified with an AUC of at least 0.76. In another embodiment, the operations include generating a classification of the region of tissue as likely to experience cancer recurrence or unlikely to experience cancer recurrence based, at least in part, on the second probability.

The operations may further include generating a cancer treatment plan based, at least in part, on the classification, and at least one of the probability, the CRF signature, or the image. In one embodiment, the cancer treatment plan may include an immunotherapy agent dosage or schedule.

In one embodiment, the operations further include controlling a personalized medicine system, a CADx system, or processor to display the cancer treatment plan, the probability, the CRF signature, or the image on a computer monitor, a smartphone display, a tablet display, or other displays.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus for predicting cancer progression, the apparatus comprising:
   a processor;
   a memory configured to store a digitized image of a region of tissue demonstrating cancerous pathology;
   an input/output (I/O) interface;
   a set of circuits comprising an image acquisition circuit, a nuclei detection and graphing circuit, a cell run-length feature (CRF) circuit, and a classification circuit; and
   an interface that connects the processor, the memory, the I/O interface, and the set of circuits;
   the image acquisition circuit configured to access an image of a region of tissue demonstrating cancerous pathology, where the image includes a plurality of pixels, a pixel having an intensity;
   the nuclei detection and graphing circuit configured to:
      detect a plurality of cellular nuclei represented in the image; and
      construct a nuclear sub-graph based on the plurality of cellular nuclei, where a node of the sub-graph is a nuclear centroid of a member of the plurality of cellular nuclei;
   the CRF circuit configured to:
      compute a cell run-length feature (CRF) vector based on the sub-graph;
      compute a set of CRF features based on the CRF vector and the sub-graph; and
      generate a CRF signature based, at least in part, on the set of CRF features; and
   the classification circuit configured to:
      compute a probability that the region of tissue will experience cancer progression, based, at least in part, on the CRF signature; and
      generate a classification of the region of tissue as a progressor or non-progressor based, at least in part, on the probability.

2. The apparatus of claim 1, where the image is a tissue micro array (TMA) of a hematoxylin and eosin (H&E) stained pathology slide of a region of tissue demonstrating p16+ oropharyngeal squamous cell cancer scanned at 40× magnification with a resolution of 0.25 μm per pixel.

3. The apparatus of claim 1, where the nuclei detection and graphing circuit is configured to detect the plurality of cellular nuclei represented in the image using a generalized Laplacian of Gaussian (gLoG) detection approach.

4. The apparatus of claim 1, where the nuclei detection and graphing circuit is configured to construct the nuclear sub-graph based on a probabilistic decaying function of the Euclidean distance between a first nuclear centroid of a first member of the plurality of cellular nuclei, and a second, different nuclear centroid of a second, different member of the plurality of cellular nuclei.

5. The apparatus of claim 1 where:
the CRF vector is defined as the number of cell runs associated with different length cell runs in the nuclear sub-graph, where a cell run is defined as a single traverse from a first end point to a second, different end point of the nuclear sub-graph, and where a length is defined as the total number of nodes traversed in the cell run.

6. The apparatus of claim 1, where the set of CRF features includes a short run emphasis feature, a long run emphasis feature, a run-length non-uniformity feature, and a run percentage feature.

7. The apparatus of claim 1, where the CRF circuit is configured to generate the CRF signature by computing, for the image, a set of first order statistics based on the set of CRF features, where the set of first order statistics include a mean, a standard deviation, a kurtosis, a skewness, and a range.

8. The apparatus of claim 1, where the classification circuit is configured as a machine learning classifier, where the machine learning classifier is a linear discriminant analysis (LDA) classifier, a quadratic discriminant analysis (QDA) classifier, a support vector machine (SVM) classifier, or a random forest (RF) classifier.

9. The apparatus of claim 1, the set of circuits further comprising a cancer treatment plan circuit configured to generate a cancer treatment plan based, at least in part, on the classification, and at least one of the probability, the CRF signature, or the image.

10. A non-transitory computer-readable storage device storing computer-executable instructions that when executed by a computer control the computer to perform a method for predicting cancer progression, the method comprising:
accessing an image of a region of tissue demonstrating cancerous pathology, where the image includes a plurality of pixels, a pixel having an intensity;
detecting a plurality of cellular nuclei represented in the image;
constructing a nuclear sub-graph based on the plurality of cellular nuclei, where a node of the sub-graph is a nuclear centroid of a member of the plurality of cellular nuclei;
computing a cell run-length feature (CRF) vector based on the sub-graph;
computing a set of CRF features based on the CRF vector and the sub-graph;
generating a CRF signature based, at least in part, on the set of CRF features;
providing the CRF signature to a machine learning classifier;
receiving, from the machine learning classifier, a probability that the region of tissue will experience cancer progression, where the machine learning classifier computes the probability based, at least in part, on the CRF signature;
generating a classification by classifying the region of tissue as a progressor or non-progressor based, at least in part, on the probability; and
generating a cancer treatment plan based, at least in part, on the classification, and at least one of the probability, the CRF signature, or the image.

11. The non-transitory computer-readable storage device of claim 10, where the image is a tissue micro array (TMA) of a hematoxylin and eosin (H&E) stained pathology slide of a region of tissue demonstrating p16+ oropharyngeal squamous cell cancer scanned at 40× magnification with a resolution of 0.25 µm per pixel.

12. The non-transitory computer-readable storage device of claim 10, where the image is a digitized whole slide image (WSI) of a region of tissue demonstrating cancerous pathology.

13. The non-transitory computer-readable storage device of claim 10, where detecting at least one cellular nucleus represented in the image includes detecting at least one cellular nucleus using a generalized Laplacian of Gaussian (gLoG) detection approach.

14. The non-transitory computer-readable storage device of claim 13, where the gLoG detection approach comprises:
generating a bank of gLoG kernels, where a first member of the bank of gLoG kernels has a first scale and a first orientation, and where a second member of the bank of gLoG kernels has a second, different scale or a second, different orientation;
generating a response map by convolving the bank of gLoG kernels with the image;
identifying a local maximum of the response map;
upon determining that a first local maximum is proximal to a second, different local maximum:
merging the first local maximum with the second, different local maximum;
determining a maximum response within a group of maxima that are proximal; and
defining the maximum response as the centroid a nucleus.

15. The non-transitory computer-readable storage device of claim 10, where the nuclear sub-graph is constructed based on a probabilistic decaying function of the Euclidean distance between a first nuclear centroid of a first member of the plurality of cellular nuclei, and a second, different nuclear centroid of a second, different member of the plurality of cellular nuclei.

16. The non-transitory computer-readable storage device of claim 10,
where the CRF vector is defined as the number of cell runs associated with different length cell runs in the nuclear sub-graph,
where a cell run is defined as a single traverse from a first end point to a second, different end point of the nuclear sub-graph, and
where a length is defined as the total number of nodes traversed in the cell run.

17. The non-transitory computer-readable storage device of claim 10, where the set of CRF features includes a short run emphasis feature, a long run emphasis feature, a run-length non-uniformity feature, and a run percentage feature.

18. The non-transitory computer-readable storage device of claim 10, where generating the CRF signature comprises computing, for the image, a set of first order statistics based on the set of CRF features, where the set of first order statistics include a mean, a standard deviation, a kurtosis, a skewness, and a range.

19. The non-transitory computer-readable storage device of claim 10, where the machine learning classifier is a linear discriminant analysis (LDA) classifier, a quadratic discriminant analysis (QDA) classifier, a support vector machine (SVM) classifier, or a random forest (RF) classifier.

20. A non-transitory computer-readable storage device storing computer-executable instructions that, in response to execution, cause a cancer progression prediction system to perform operations comprising:

accessing an image of a region of tissue demonstrating cancerous pathology, where the image includes a plurality of pixels, a pixel having an intensity;

detecting a plurality of cellular nuclei represented in the image;

constructing a nuclear sub-graph based on the plurality of cellular nuclei, where a node of the sub-graph is a nuclear centroid of a member of the plurality of cellular nuclei;

computing a cell run-length feature (CRF) vector based on the sub-graph;

computing a set of CRF features based on the CRF vector and the sub-graph;

generating a CRF signature based, at least in part, on the set of CRF features;

computing a probability that the region of tissue will experience cancer progression based, at least in part, on the CRF signature;

generating a classification by classifying the region of tissue as a progressor or non-progressor based, at least in part, on the probability;

generating a cancer treatment plan based, at least in part, on the classification, and at least one of the probability, the CRF signature, or the image; and displaying, the cancer treatment plan and at least one of the classification, the probability, the CRF signature, or the image on a computer monitor.

* * * * *

UNITED STATES PATENT AND TRADEMARK OFFICE
CERTIFICATE OF CORRECTION

| | | |
|---|---|---|
| PATENT NO. | : 10,503,959 B2 | Page 1 of 1 |
| APPLICATION NO. | : 15/901190 | |
| DATED | : December 10, 2019 | |
| INVENTOR(S) | : Anant Madabhushi et al. | |

It is certified that error appears in the above-identified patent and that said Letters Patent is hereby corrected as shown below:

In the Specification

Column 1, Lines 12 through 25; please replace "The invention was made with government support under the National Cancer Institute of the National Institutes of Health award numbers 1U24CA199374-01, R01CA202752-01A1, R01CA208236-01A1, R21CA195152-01, R21CA179327-01A1, the National Institute of Diabetes and Digestive and Kidney Diseases under award number R01 DK098503-02, National Center for Research Resources under award number 1 C06 RR12463-01, the DOD Prostate Cancer Synergistic Idea Development Award (PC120857), the DOD Lung Cancer Idea Development New Investigator Award (LC130463), the DOD Prostate Cancer Idea Development Award, and the DOD Peer Reviewed Cancer Research Program W81XWH-16-1-0329. The government has certain rights in the invention." with --This invention was made with government support under grants CA199374, CA202752, CA208236, CA195152, CA179327, DK098503, and RR012463 awarded by the National Institutes of Health; and grant(s) W81XWH-16-1-0329, W81XWH-14-1-0323, W81XWH-13-1-0418, and W81XWH-15-1-0558 awarded by the Department of Defense. The government has certain rights in the invention.--

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*